United States Patent
Du et al.

(10) Patent No.: US 9,691,137 B2
(45) Date of Patent: Jun. 27, 2017

(54) RADIAL DISTORTION PARAMETER ACQUIRING METHOD AND APPARATUS

(71) Applicant: Huawei Technologies Co., Ltd., Shenzhen (CN)

(72) Inventors: Xin Du, Hangzhou (CN); Shuiping Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 105 days.

(21) Appl. No.: 14/553,774

(22) Filed: Nov. 25, 2014

(65) Prior Publication Data
US 2015/0146048 A1 May 28, 2015

(30) Foreign Application Priority Data
Nov. 27, 2013 (CN) .......................... 2013 1 0616512

(51) Int. Cl.
*H04N 5/217* (2011.01)
*G06T 5/00* (2006.01)

(52) U.S. Cl.
CPC .... *G06T 5/006* (2013.01); *G06T 2207/30204* (2013.01)

(58) Field of Classification Search
CPC ...................................................... G06T 5/006
(Continued)

(56) References Cited
U.S. PATENT DOCUMENTS
9,019,405 B2 * 4/2015 Stafford ............... H04N 5/3572
348/207.99
2005/0013504 A1 * 1/2005 Noma ..................... G01C 25/00
382/255
(Continued)

FOREIGN PATENT DOCUMENTS
CN 1996389 A 7/2007
CN 101216895 A 7/2008
(Continued)

OTHER PUBLICATIONS
Abstract of "A Simple Method of Radial Distortion Correction with Centre of Distortion Estimation," Journal of Mathematical Imaging and Vision, vol. 35, Issue 3, pp. 165-172 (Nov. 2009).
(Continued)

Primary Examiner — Sinh Tran
Assistant Examiner — Zhenzhen Wu
(74) Attorney, Agent, or Firm — Leydig, Voit & Mayer, Ltd.

(57) ABSTRACT

Embodiments of the present invention disclose a radial distortion parameter acquiring method and apparatus. The method includes: randomly selecting a plane as a first plane; making an optical axis of a digital image capture device perpendicular to the first plane, and photographing the first plane to obtain a distorted image of the first plane; acquiring n arcs from the distorted image; and obtaining, by calculation, a radial distortion parameter of the digital image capture device according to the arcs. The apparatus includes: a selecting unit, a photographing unit, an acquiring unit, and a calculating unit. By applying the embodiments of the present invention, only one distorted image needs to be photographed to acquire a radial distortion parameter of a digital image capture device, and the distorted image can be acquired depending on a natural environment.

12 Claims, 5 Drawing Sheets

(58) Field of Classification Search
USPC ............... 348/241, 335, 207.99; 382/275
See application file for complete search history.

(56) References Cited

U.S. PATENT DOCUMENTS

| | | | | |
|---|---|---|---|---|
| 2006/0093239 | A1* | 5/2006 | Kakinami | G06T 3/0018 |
| | | | | 382/275 |
| 2007/0206877 | A1* | 9/2007 | Wu | G06K 9/3283 |
| | | | | 382/275 |
| 2009/0059041 | A1* | 3/2009 | Kwon | H04N 5/217 |
| | | | | 348/241 |
| 2012/0057053 | A1* | 3/2012 | Mallon | G01M 11/0264 |
| | | | | 348/241 |
| 2012/0170853 | A1* | 7/2012 | Song | G06T 5/006 |
| | | | | 382/199 |
| 2012/0170865 | A1* | 7/2012 | Song | H04N 5/217 |
| | | | | 382/275 |
| 2013/0077890 | A1* | 3/2013 | Chen | G06T 5/002 |
| | | | | 382/275 |
| 2015/0139567 | A1* | 5/2015 | Majewicz | H04N 1/38 |
| | | | | 382/275 |

FOREIGN PATENT DOCUMENTS

| | | |
|---|---|---|
| CN | 101414380 A | 4/2009 |
| CN | 101794449 A | 8/2010 |
| CN | 101814186 A | 8/2010 |
| CN | 102208108 A | 10/2011 |

OTHER PUBLICATIONS

Bukhari et al., "Automatic Radial Distortion Estimation from a Single Image," Journal of Mathematical Imaging and Vision manuscript, vol. 45, Issue 1, pp. 31-45 (Jan. 2013).

Zhu, "Calibration of Radial Distortion and Intrinsic Parameters Using a Single Image," Opto-Electronic Engineering, vol. 29, Issue 9, p. 125-131 (Sep. 2012).

Fitzgibbon, "Simultaneous linear estimation of multiple view geometry and lens distortion," Proceedings of the 2001 IEEE Computer Society Conference on Computer Vision and Pattern Recognition, pp. 1-8, Institute of Electrical and Electronics Engineers, New York, New York (Dec. 8-14, 2001).

Bukhari et al., "Robust Radial Distortion from a Single Image," Proceedings of the 6th International Symposium on Visual Computing, Lecture Notes in Computer Science 6454, Part II, Advances in Visual Computing pp. 11-20, Springer-Verlag, Berlin, Germany (Dec. 1, 2010).

* cited by examiner

RADIAL DISTORTION PARAMETER ACQUIRING METHOD AND APPARATUS

CROSS-REFERENCE TO RELATED APPLICATION

This application claims priority to Chinese Patent Application No. 201310616512.6, filed on Nov. 27, 2013, which is hereby incorporated by reference in its entirety.

TECHNICAL FIELD

The present invention relates to the field of image processing, and in particular, to a radial distortion parameter acquiring method and apparatus.

BACKGROUND

Lens distortion is a generic term for perspective distortion that exists in an image. All images that are obtained, by photographing, by using a digital image capture device to some extent have lens distortion; therefore, an image that is obtained, by photographing, by using a digital image capture device is also referred to as a distorted image. Lens distortion includes types such as radial distortion, decentering distortion, and thin prism distortion, where radial distortion has greatest impact on image distortion. Radial distortion causes a point in an image to produce a radial movement relative to a distortion center, and a farther distance of a point from a distortion center indicates a larger amount of a movement. Due to existence of radial distortion, in a distorted image that is obtained, by photographing, by using a digital image capture device, a farther distance of a part from a distortion center indicates severer distortion.

In the field of image processing, a quantitative analysis method is more widely applied. When quantitative analysis is performed on a distorted image, severer image distortion caused by radial distortion indicates poorer accuracy of a quantitative analysis result. To reduce impact of radial distortion on accuracy of a quantitative analysis result, a common practice is that, radial distortion in a distorted image is first corrected and then quantitative analysis is performed on the corrected image. Correcting radial distortion may reduce image distortion, thereby improving accuracy of a quantitative analysis result. In a process of correcting radial distortion, a radial distortion parameter of a digital image capture device needs to be used. The radial distortion parameter includes a distortion coefficient and a distortion center.

In the prior art, there are multiple methods for acquiring a radial distortion parameter. In all these methods, first it is assumed that a digital image capture device conforms to a pinhole imaging model, and by moving a calibration board or the digital image capture device, the calibration board is photographed from multiple different angles to obtain multiple distorted images; an angular point of the calibration board is used as a feature point to obtain, by calculation, an intrinsic parameter of the digital image capture device; and then a radial distortion parameter is obtained according to the intrinsic parameter by using a non-linear optimization method.

After studying the prior art, the inventor finds that, a process of acquiring a radial distortion parameter by using an existing method is very complicated, in which not only a calibration board needs to be used, but also multiple images needs to be photographed. As a result, operation is inconvenient, and practicability is poor.

SUMMARY

Embodiments of the present invention provide a radial distortion parameter acquiring method and apparatus, so as to solve a problem that an existing radial distortion parameter acquiring method is inconvenient in operation and poor in practicability.

According to a first aspect, the present invention provides a radial distortion parameter acquiring method, where the method includes: randomly selecting a plane as a first plane; making an optical axis of a digital image capture device perpendicular to the first plane, and photographing the first plane to obtain a distorted image of the first plane, where the distorted image includes images of m straight lines, the m straight lines are located on the first plane, the m straight lines are parallel to each other, and m≥2; acquiring n arcs from the distorted image, where each arc represents an image of a straight line in the m straight lines, and 2≤n≤m; and obtaining, by calculation, a radial distortion parameter of the digital image capture device according to the arcs.

With reference to the first aspect, in a first possible implementation manner of the first aspect, the acquiring n arcs from the distorted image includes: acquiring n point sets from the distorted image, where each point set includes three or more than three points in an image of a candidate straight line, and the candidate straight line is one of the m straight lines; and obtaining an arc by fitting by using each of the point sets.

With reference to the first aspect, in a second possible implementation manner of the first aspect, the acquiring n arcs from the distorted image includes: acquiring n point sets from the distorted image, where each point set includes three or more than three points in an image of a candidate straight line, and the candidate straight line is one of the m straight lines; determining an outline boundary of the distorted image; acquiring an arc set from a distorted image within the outline boundary, where the arc set includes arcs corresponding to images of all straight lines in the distorted image within the outline boundary; and separately acquiring an arc from the arc set, where a distance from the arc to a point set is the shortest.

With reference to the second possible implementation manner of the first aspect, in a third possible implementation manner of the first aspect, the determining an outline boundary of the distorted image includes: extracting edge points of the distorted image by using the Canny operator; and linking the edge points to obtain the outline boundary of the distorted image.

With reference to the second possible implementation manner of the first aspect or the third possible implementation manner of the first aspect, in a fourth possible implementation manner of the first aspect, the acquiring an arc set from a distorted image within the outline boundary includes: acquiring the arc set from the distorted image within the outline boundary by using the Random Sample Consensus RANSAC algorithm, where the arc set includes the arcs corresponding to the images of all the straight lines in the distorted image within the outline boundary.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the obtaining, by calculation, a radial distortion parameter of the digital image capture device according to the arcs includes: acquiring coordinates $(x_1, y_1)$ of a first intersection point of the n arcs and coordinates $(x_2, y_2)$ of a second intersection point of the n arcs; and calculating coordinates) $(x_{d0}, y_{d0})$ of a distortion center and a distortion coefficient $\lambda$ according to the coordinates of the intersection points, where $x_{d0}=(x_1+x_2)/2$, $y_{d0}=(y_1+y_2)/2$, $\lambda=-4/d^2$, and $d=\sqrt{(x_1-x_2)^2+(y_1-y_2)^2}$.

According to a second aspect, the present invention provides a radial distortion parameter acquiring apparatus, where the apparatus includes: a selecting unit, configured to randomly select a plane as a first plane; a photographing unit, configured to make an optical axis of a digital image capture device perpendicular to the first plane that is selected by the selecting unit, and photograph the first plane to obtain a distorted image of the first plane, where the distorted image includes images of m straight lines, the m straight lines are located on the first plane, the m straight lines are parallel to each other, and m≥2; an acquiring unit, configured to acquire n arcs from the distorted image that is obtained by photographing by the photographing unit, where each arc represents an image of a straight line in the m straight lines, and 2≤n≤m; and a calculating unit, configured to obtain, by calculation, a radial distortion parameter of the digital image capture device according to the arcs that are acquired by the acquiring unit.

With reference to the second aspect, in a first possible implementation manner of the second aspect, the acquiring unit includes: a first point set acquiring subunit, configured to acquire n point sets from the distorted image, where each point set includes three or more than three points in an image of a candidate straight line, and the candidate straight line is one of the m straight lines; and an arc fitting subunit, configured to obtain an arc by fitting by using each of the point sets that are acquired by the first point set acquiring subunit.

With reference to the second aspect, in a second possible implementation manner of the second aspect, the acquiring unit includes: a second point set acquiring subunit, configured to acquire n point sets from the distorted image, where each point set includes three or more than three points in an image of a candidate straight line, and the candidate straight line is one of the m straight lines; a boundary determining subunit, configured to determine an outline boundary of the distorted image; an arc set generating subunit, configured to acquire an arc set from a distorted image within the outline boundary that is determined by the boundary determining subunit, where the arc set includes arcs corresponding to images of all straight lines in the distorted image within the outline boundary; and an arc selecting subunit, configured to separately acquire an arc from the arc set that is generated by the arc set generating subunit, where a distance from the arc to a point set that is acquired by the second point set acquiring subunit is the shortest.

With reference to the second possible implementation manner of the second aspect, in a third possible implementation manner of the second aspect, the boundary determining subunit includes: an edge point extracting subunit, configured to extract edge points of the distorted image by using the Canny operator; and an edge point linking subunit, configured to link the edge points that are extracted by the edge point extracting subunit, to obtain the outline boundary of the distorted image.

With reference to the second possible implementation manner of the second aspect or the third possible implementation manner of the second aspect, in a fourth possible implementation manner of the second aspect, the arc set generating subunit is configured to acquire the arc set from the distorted image within the outline boundary by using the Random Sample Consensus RANSAC algorithm, where the arc set includes the arcs corresponding to the images of all the straight lines in the distorted image within the outline boundary.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the calculating unit includes: an intersection point acquiring subunit, configured to acquire coordinates $(x_1, y_1)$ of a first intersection point of the n arcs and coordinates $(x_2, y_2)$ of a second intersection point of the n arcs; and a parameter calculating subunit, configured to calculate coordinates $(x_{d0}, y_{d0})$ of a distortion center and a distortion coefficient $\lambda$ according to the coordinates of the intersection points, where the coordinates of the intersection points are acquired by the intersection point acquiring subunit, $x_{d0}=(x_1+x_2)/2$, $y_{d0}=(Y_1+y_2)/2$, $\lambda=-4/d^2$, and $d=\sqrt{(x_1-x_2)^2+(y_1-y_2)^2}$.

In the embodiments of the present invention, a plane is randomly selected as a first plane; an optical axis of a digital image capture device is made perpendicular to the first plane, and the first plane is photographed to obtain a distorted image of the first plane, where the distorted image includes images of m straight lines, the m straight lines are located on the first plane, the m straight lines are parallel to each other, and m≥2; n arcs are acquired from the distorted image, where each arc represents an image of a straight line in the m straight lines, and 2≤n≤m; a radial distortion parameter of the digital image capture device is obtained, by calculation, according to the arcs; and a radial distortion parameter of the image photographed by the digital image capture device is acquired according to the radial distortion parameter. By applying the embodiments of the present invention, only one distorted image needs to be photographed to acquire a radial distortion parameter of a digital image capture device, and the distorted image can be acquired depending on a natural environment without using a calibration board, so that operation is relatively convenient and practicability is high.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts. The foregoing and other objectives, features, and advantages of the present invention are clearer by illustration of these accompanying drawings. In all the accompanying drawings, an identical reference numeral indicates a same part. The accompanying drawings are not deliberately scaled according to a proportion such as an actual dimension; and the emphasis is to illustrate the subject of the present invention.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
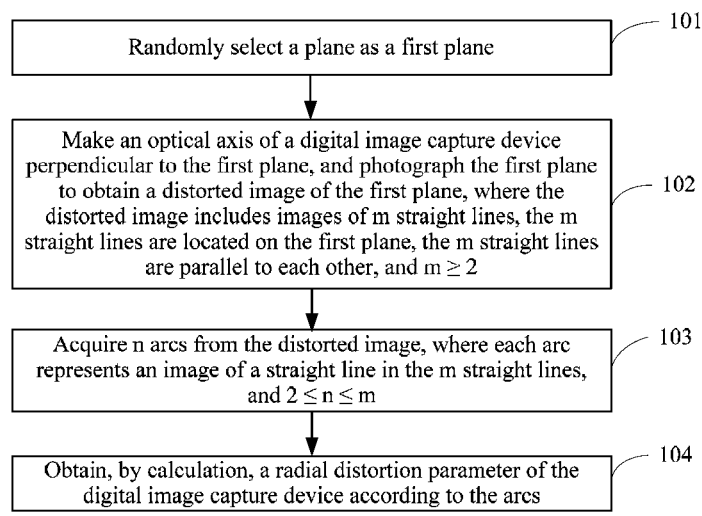
FIG. 1 is a flowchart of an embodiment of a radial distortion parameter acquiring method according to the present invention.

Referring to FIG. 1, FIG. 1 is a flowchart of an embodiment of a radial distortion parameter acquiring method according to the present invention. This embodiment includes the following steps:

Step 101: Randomly select a plane as a first plane.

By using the method provided by the present application to acquire a radial distortion parameter of a digital image capture device, a plane may be randomly selected as a first plane. The first plane may include m straight lines, where the m straight lines are parallel to each other, and m ≥2. For ease of processing by using a device such as a computer, a straight line herein may be a linear pattern that can be photographed by the digital image capture device, including a ridge, a color boundary, a line pattern, and the like on a visible object, for example, a straight line that is drawn on a paper by using a pen, a boundary between different grids on a calibration board, and a floor seam. The m straight lines may be all straight lines on the first plane, and may also be a part of straight lines on the first plane, which are not limited herein.

Because countless planes that meet the foregoing condition exist in nature, during selection of the first plane, a plane may be randomly selected from the planes that meet the foregoing condition. By randomly selecting a plane that includes m parallel straight lines as the first plane, a process of acquiring a radial distortion parameter may no longer depend on a calibration board; and in this way, the radial distortion parameter may be acquired more conveniently.

Step 102: Make an optical axis of a digital image capture device perpendicular to the first plane, and photograph the first plane to obtain a distorted image of the first plane, where the distorted image includes images of m straight lines, the m straight lines are located on the first plane, the m straight lines are parallel to each other, and m≥2.

After the first plane is determined, a position and a stance of the digital image capture device are first adjusted so that the optical axis of the digital image capture device is perpendicular to the first plane, where the digital image capture device is a digital image capture device of which a radial distortion parameter is to be acquired. After adjustment, when the optical axis of the digital image capture device is perpendicular to the first plane, the digital image capture device is used to photograph the first plane to obtain the distorted image.

Step 103: Acquire n arcs from the distorted image, where each arc represents an image of a straight line in the m straight lines, and 2≤n≤m.

Under an ideal perspective projection model, in an ideal image that is obtained by photographing when the optical axis of the digital image capture device is perpendicular to a plane π, an image of a straight line l on the plane π also appears to be linear, and therefore, the image of the straight line l may be represented by a straight line l'. However, radial distortion occurs to a lens of the digital image capture device, in an actual case, in a distorted image that is obtained by photographing when the optical axis of the digital image capture device is perpendicular to the plane π, the image of the straight line l on the plane π appears to be arc-shaped, and therefore, the image of the straight line l may be represented by an arc Arc. By using the arc Arc to represent an image, which is formed under a radial distortion action, of the straight line l, a curvilinear equation of the arc Arc then includes information about the radial distortion parameter of the digital image capture device. The radial distortion parameter of the digital image capture device can be determined according to arcs corresponding to images of the m parallel straight lines. Therefore, when the radial distortion parameter of the digital image capture device is acquired, an arc needs to be extracted from the distorted image first.

To acquire the arc Arc corresponding to the straight line l from the distorted image, a direct fitting manner may be used so as to directly obtain, by fitting, the arc Arc according to points in the image of the straight line l. If the direct fitting manner is used, a point set $S_l$ that includes three or more than three points in the image of the straight line l may be acquired, and arc fitting is performed according to points in the point set $S_l$ to acquire the arc Arc.

To acquire the arc Arc corresponding to the straight line l from the distorted image, a matching manner may also be used. Specifically, arcs corresponding to images of all straight lines in the distorted image are first obtained by fitting, and these arcs may form an arc set. Because the arc set may include arcs corresponding to images of multiple straight lines, the arc Arc corresponding to the image of the straight line l needs to be selected from the arc set. When the arc Arc corresponding to the image of the straight line l is selected from the arc set, the point set $S_l$ that includes three or more than three points on the image of the straight line l may be acquired; and an arc, a distance from which to the points in the point set $S_l$ is the shortest, is found from the arc set. The arc, a distance from which to the points in the point set $S_l$ is the shortest, is the arc Arc. Herein, it should be noted that, in actual use, an arc set may be acquired first, or a point set may be acquired first, which is not limited in the present invention.

Because the distorted image is a pixel image that is obtained by photographing by the digital image capture device, before the arc set is acquired, an outline boundary of the distorted image may be determined first. The outline boundary of the distorted image may be determined by using the Canny operator (Canny operator), and the Canny operator is also referred to as the Canny operator. The Canny operator may be used to directly acquire single-pixel edge points, and edge points of the distorted image can be rapidly acquired. When the Canny operator is used to determine the outline boundary of the distorted image, the Canny operator may be used to first extract the edge points of the distorted image, and then link the edge points to obtain the outline boundary of the distorted image.

When the arc set is acquired, the Random Sample Consensus (RANSAC, Random Sample Consensus) algorithm may be used to acquire each arc that forms the arc set. The RANSAC algorithm has good robustness, which may reduce impact of an error and make an arc that is obtained by fitting more accurate.

If n arcs need to be acquired, each arc may be acquired by using the foregoing fitting manner. For example, when two arcs need to be acquired, the foregoing direct fitting manner or matching manner may be used to acquire the two arcs; and when three arcs need to be acquired, the foregoing direct fitting manner or matching manner may be used to acquire the three arcs.

Step 104: Obtain, by calculation, a radial distortion parameter of the digital image capture device according to the arcs.

Radial distortion of the digital image capture device may be represented by using a single parameter division model. A formula of the single parameter division model may be represented as $$x_u = \frac{x_d}{1 + \lambda r_d^2},$$

where $x_d = (x_d, y_d)$ is a point in the distorted image that is photographed by the digital image capture device, $x_u = (x_u, y_u)$ is a point in a non-distorted image obtained after correction, $r_d$ is an Euclidean distance between $x_d$ and a distortion center point $(x_{d0}, y_{d0})$, $r_d = \sqrt{(x_d - x_{d0})^2 + (y_d - y_{d0})^2}$, and $\lambda$ is a distortion coefficient.

Under an ideal perspective projection model, the image, appearing in an ideal image, of the straight line $l$ on the plane $\pi$ may be represented by a straight line $l'$. Therefore, in an image coordinate system, the straight line $l'$ may be represented as $ax_u + by_u + c = 0$, where $a, b, c$ are coefficients of the linear equation.

In an actual case, because radial distortion exists, the image, appearing on the distorted image that is photographed by the digital image capture device, of the straight line $l$ on the plane $\pi$ needs to be represented by using the arc Arc. In an image coordinate system of the distorted image, a curvilinear equation of the arc Arc may be represented as $$x_d^2 + y_d^2 + \frac{a}{c\lambda}x_d + \frac{b}{c\lambda}y_d + \frac{1}{\lambda} = 0,$$

where $a, b, c$ are coefficients of the arc equation, and $\lambda$ is a distortion coefficient. The curvilinear equation may be obtained by substituting a formula of the single parameter division model into the foregoing linear equation.

It may be learned from a characteristic of radial distortion of the digital image capture device that, if the first plane has m straight lines, then the distorted image that is obtained by photographing the first plane may have images of the m straight lines and an image of each straight line may be represented by using an arc. If the m straight lines are parallel to each other, arcs corresponding to the m straight lines intersect at two intersection points. Therefore, curvilinear equations of the m arcs may be associated to obtain coordinates) $(x_1, y_1)$ of a first intersection point $p_1$ and coordinates $(x_2, y_2)$ of a second intersection point $p_2$.

Because all arcs intersect at two same intersection points, or only n arcs may be selected from the m arcs so as to obtain coordinates of the two interaction points. When $2 \leq n \leq m$, curvilinear equations of the n arcs may be associated to obtain the coordinates $(x_1, y_1)$ of the first intersection point $p_1$ and the coordinates $(x_2, y_2)$ of the second intersection point $P_2$ as well.

In an actual operation, due to an error existing when an arc is acquired and an error existing in a calculation process, when $n > 2$, multiple interaction points may be generated among the n arcs, that is, an equation set that is obtained by associating the curvilinear equations of the n arcs is an incompatible equation set. In this case, curvilinear equations of every two arcs may be associated to acquire multiple intersection points and then the first intersection point and the second intersection point is acquired according to the intersection points. When the first intersection point and the second intersection point are acquired according to the multiple intersection points, two intersection points may be selected from the multiple intersection points as the first intersection point $p_1$ and the second intersection point $p_2$ according to distribution status of the multiple intersection points; or two new points may be generated as the first intersection point $p_1$ and the second intersection point $p_2$ according to distribution status of the multiple intersection points; or two intersection points of any two arcs may be selected from the multiple intersection points as the first intersection point $p_1$ and the second intersection point $p_2$.

It may be learned from the single parameter division model that, a distortion center $p_0$ is a midpoint of a line connecting the first intersection point $p_1$ and the second intersection line $p_2$. After the coordinates $(x_1, y_1)$ of the first intersection point $p_1$ and the coordinates $(x_2, y_2)$ of the second intersection point $p_2$ are acquired, coordinates $(x_{d0}, y_{d0})$ of the distortion center $p_0$ can be easily obtained, where $x_{d0} = (x_1 + x_2)/2$, and $y_{d0} = (y_1 + y_2)/2$.

It may also be learned from the single parameter division model that, the distortion coefficient $\lambda = -4/d^2$, where d is a distance between the first intersection point $p_1$ and the second intersection point $p_2$. After the coordinates $(x_1, y_1)$ of the first intersection point $p_1$ and the coordinates $(x_2, y_2)$ of the second intersection point $p_2$ are acquired, the distance d between the first intersection point $p_1$ and the second intersection point $p_2$ may be obtained by calculation, where $d = \sqrt{(x_1 - x_2)^2 + (y_1 - y_2)^2}$; and in this way, the distortion coefficient $\lambda$ may be obtained, where $\lambda = -4/d^2$, that is $$\lambda = \frac{-4}{(x_1 - x_2)^2 + (y_1 - y_2)^2}.$$

After the distortion center $p_0$ and the distortion coefficient $\lambda$ are obtained by using the coordinates $(x_1, y_1)$ of the first intersection point $p_1$ and the coordinates $(x_2, y_2)$ of the second intersection point $p_2$, processing such as radial distortion correction may be performed according to the distortion center $p_0$ and the distortion coefficient $\lambda$ on all images that are photographed by the digital image capture device. A specific process is not described in detail herein again.

It may be seen from the foregoing embodiment that, a plane is selected so that an optical axis of a digital image capture device is perpendicular to the plane; and a distorted image is photographed, and a radial distortion parameter of the digital image capture device is acquired according to an arc that is acquired from the distorted image. By applying this embodiment of the present invention, only one distorted image needs to be photographed to acquire a radial distortion parameter of a digital image capture device, and the distorted image can be acquired depending on a natural environment. The radial distortion parameter acquiring method provided by this embodiment has advantages such as convenient operation, wide applicability, and high practicability.

The following further describes a radial distortion parameter acquiring method of the present invention with reference to a specific example.

Figure 2A:
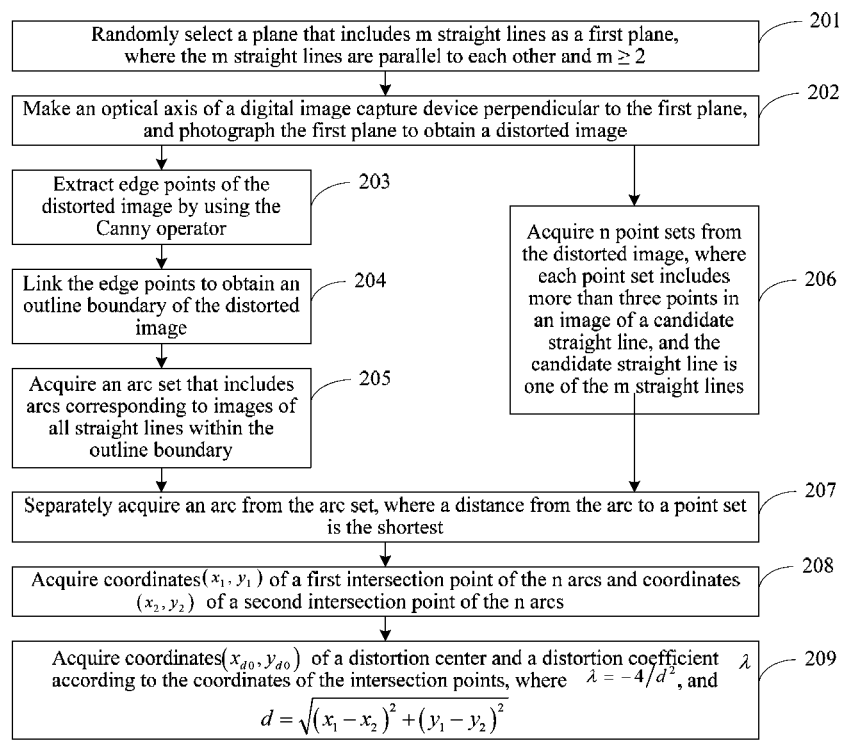
FIG. 2A is a flowchart of another embodiment of a radial distortion parameter acquiring method according to the present invention.

Referring to FIG. 2A, FIG. 2A is a flowchart of another embodiment of a radial distortion parameter acquiring method according to the present invention.

Step 201: Randomly select a plane that includes m straight lines as a first plane, where the m straight lines are parallel to each other and m≥2.

In three-dimensional space, two parallel straight lines may determine a plane; therefore, in real space, multiple planes that are visible to human eyes may be easily found, and these planes include two or more than two parallel straight lines.

When multiple planes meet a requirement of the first plane, a plane is randomly selected from the multiple planes as the first plane. For example, in a room, a plane may be determined separately according to a floor, ceiling, door, window, and the like, and these planes may all meet a requirement of serving as the first plane. In this case, only one plane needs to be randomly selected to serve as the first plane.

Step 202: Make an optical axis of a digital image capture device perpendicular to the first plane, and photograph the first plane to obtain a distorted image.

Figure 2B:
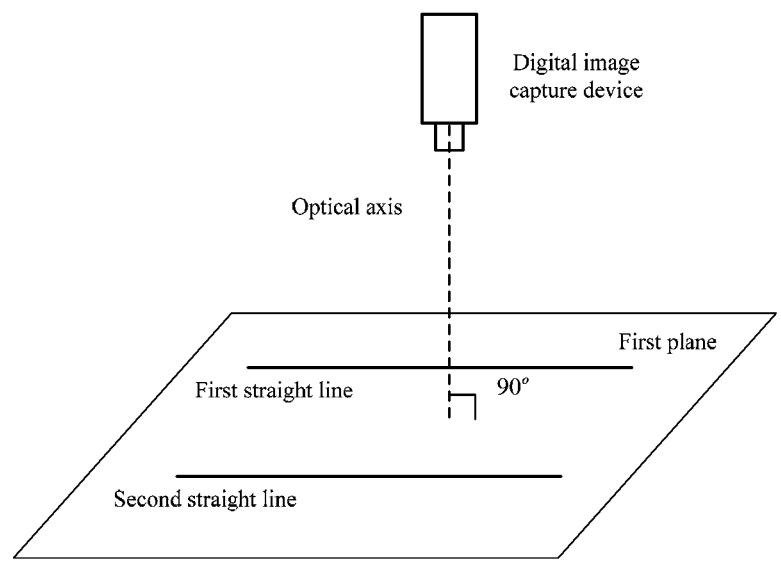
FIG. 2B is a schematic diagram of a spatial relationship between a digital image capture device and a first plane in the another embodiment of the radial distortion parameter acquiring method according to the present invention.

As shown in FIG. 2B, after the first plane is determined, a position and a stance of the digital image capture device are first adjusted so that the optical axis of the digital image capture device is perpendicular to the first plane, for example, the optical axis of the digital image capture device is made perpendicular to a selected ceiling or floor plane.

After the optical axis of the digital image capture device is perpendicular to the first plane, the digital image capture device is used for photographing to obtain a distorted image. Because the first plane includes m straight lines, when the digital image capture device is used for photographing, the distorted image only needs to include images of two or more than two straight lines of the m straight lines. For example, the first plane includes three parallel straight lines: a first straight line, a second straight line, and a third straight line; however, the distorted image includes only images of two straight lines, that is, the first straight line and the second straight line.

Step 203: Extract edge points of the distorted image by using the Canny operator.

The distorted image is a pixel image that is obtained by photographing by using the digital image capture device; therefore, before an arc set is acquired, an outline boundary of the distorted image may be first determined. Edge points of the distorted image may be determined by using the Canny operator. The Canny operator may be used to directly acquire single-pixel edge points, and the edge points of the distorted image can be rapidly acquired.

Step 204: Link the edge points to obtain an outline boundary of the distorted image.

After the pixel edge points of the distorted image are acquired by using the Canny operator, adjacent edge points are linked to obtain the boundary of the distorted image.

Step 205: Acquire an arc set that includes arcs corresponding to images of all straight lines within the outline boundary.

To increase a speed and improve accuracy of acquiring a required arc from the distorted image, the arcs corresponding to the images of all the straight lines in the distorted image may be first obtained by fitting. All arcs that are obtained, by fitting, from the distorted image may form an arc set. Because the first plane may further include another straight line in addition to the m straight lines, the arc set may further include an arc corresponding to an image of the another straight line in addition to the arcs corresponding to the images of the m straight lines. For example, if the distorted image further includes an image of a fourth straight line in addition to the images of the two straight lines, that is, the first straight line and the second straight line, where the fourth straight line is also located on the first plane but the fourth straight line is not parallel to the first straight line. In this case, the fourth straight line is not one of the m arcs, but an arc corresponding to the image of the fourth straight line is also in the arc set.

When the arc set is acquired, the RANSAC algorithm may be used to acquire each arc that forms the arc set. The RANSAC algorithm has good robustness, which can make an arc that is obtained by fitting more accurate.

Step 206: Acquire n point sets from the distorted image, where each point set includes three or more than three points in an image of a candidate straight line, and the candidate straight line is one of the m straight lines.

Because the arc set may further include an arc corresponding to an image of another straight line in addition to the arcs corresponding to the images of the m straight lines, the arcs corresponding to the images of the m straight lines need to be acquired from the arc set.

Because a first intersection point and a second intersection point may be determined by using arcs corresponding to images of only two parallel straight lines, in actual use, not all the arcs corresponding to the images of the m straight lines need to be acquired, and only n straight lines need to be selected from the m straight lines as candidate straight lines to acquire arcs corresponding to images of the n candidate straight lines, where 2≤n≤m.

In required arcs may be selected from the arc set according to given points. If all the given points are on an arc, the arc is an arc to be acquired. Therefore, n point sets need to be acquired first before the n arcs are acquired, where each point set includes three or more than three points. Points in a same point set are points on an image of a same candidate straight line. Points in each point set may be manually selected by a person skilled in the art according to the distorted image, or may be automatically selected by a device such as a computer according to information about the distorted image such as a pixel color and luminance.

Herein, it should be noted that, an execution sequence between steps 203 to 205 and step 206 is not limited in the present invention. Steps 203 to 205 may be executed first, or step 206 may be executed first.

Step 207: Separately acquire an arc from the arc set, where a distance from the arc to a point set is the shortest.

Theoretically, all points in each point set should be located on a same arc, and the arc is an arc in the arc set. However, in an actual case, an arc in an arc set is an arc obtained by fitting, and therefore, a certain error may exist between an arc obtained by fitting and an arc that corresponds to an image of a straight line in an ideal situation. Moreover, all points in each point set are selected according to the distorted image, a certain error may also exist. To eliminate impact of an error, after a first point set is acquired, an arc, a distance from which to a point in the first point set is the shortest, may be selected from the arc set as a first arc according to coordinates of multiple points in the first point set. When n arcs need to be acquired, all the arcs may be acquired in a same manner, which is not described in detail herein again.

Step 208: Acquire coordinates $(x_1,y_1)$ of a first intersection point of the n arcs and coordinates $(x_2,y_2)$ of a second intersection point of the n arcs.

Because the n arcs may all be represented by using a curvilinear equation, two solutions may be obtained by associating curvilinear equations of the n arcs, and the two solutions are coordinates $(x_1,y_1)$ of a first intersection point $p_1$ and coordinates $(x_2,y_2)$ of a second intersection point $p_2$. If an incompatible equation set is obtained by associating the curvilinear equations of the n arcs, which is caused by existence of an error, any two arcs may be randomly selected from the n arcs, curvilinear equations of the two arcs may be associated to obtain two solutions, and the two solutions may be used as the coordinates $(x_1,y_1)$ of the first intersection point $p_1$ and the coordinates $(x_2,y_2)$ of the second intersection point $p_2$.

Herein, it should be noted that, the curvilinear equations and coordinates of the two intersection points herein are equations and coordinates. In an image coordinate system of the distorted image.

Step 209: Acquire coordinates $(x_{d0},y_{d0})$ of a distortion center and a distortion coefficient $\lambda$ according to the coordinates of the intersection points, where $x_{d0}=(x_1+x_2)/2$, $y_{d0}=(y_1+y_2)/2$, $\lambda=-4/d^2$, and $d=\sqrt{(x_1-x_2)^2+(y_1-y_2)^2}$.

Figure 2C:
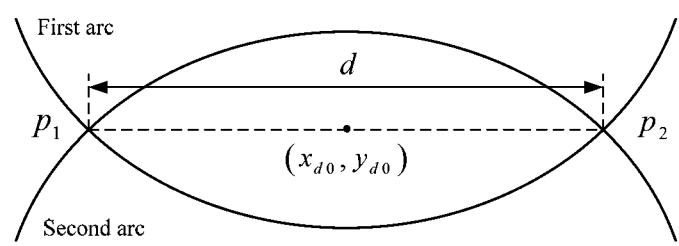
FIG. 2C is a schematic diagram of an intersection point relationship between a distortion center and an arc in the another embodiment of the radial distortion parameter acquiring method according to the present invention.

It may be learned from a single parameter division model that, a midpoint of a line connecting the first intersection point and the second intersection point is the distortion center to be acquired. As shown in FIG. 2C, the coordinates $(x_{d0},y_{d0})$ of the distortion center may be obtained according to the coordinates $(x_1, y_1)$ of the first intersection point and the coordinates $(x_2,y_2)$ of the second intersection point, that is $x_{d0}=(x_1+x_2)/2$, and $y_{d0}=(y_1+y_2)/2$. In the same way, it may be learned from the single parameter division model that, the distortion coefficient $\lambda=-4/d^2$, where d is a distance between the first intersection point and the second intersection point, that is $d=\sqrt{(x_1-x_2)^2+(y_1-y_2)^2}$.

It may be seen from the foregoing embodiment that, a radial distortion parameter of a digital image capture device may be acquired by using the digital image capture device to photograph only one distorted image, and the radial distortion parameter acquiring method is convenient in operation. The acquiring of the distorted image does not depend on a calibration board, and therefore, a reference object can be found in a natural environment and the radial distortion parameter acquiring method has wide applicability. Therefore, the acquiring method provided by this embodiment has advantages such as convenient operation, wide applicability, and high practicability.

Corresponding to the radial distortion parameter acquiring method of the present invention, the present invention further provides a radial distortion parameter acquiring apparatus.

Figure 3:
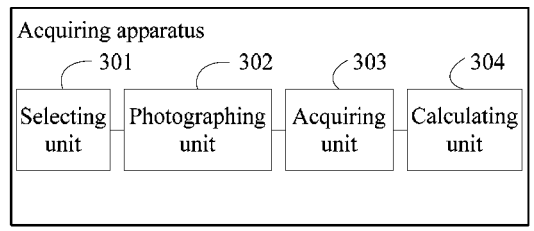
FIG. 3 is a block diagram of an embodiment of a radial distortion parameter acquiring apparatus according to the present invention.

Referring to FIG. 3, FIG. 3 is a block diagram of an embodiment of a radial distortion parameter acquiring apparatus according to the present invention.

The apparatus includes: a selecting unit 301, a photographing unit 302, an acquiring unit 303, and a calculating unit 304.

The selecting unit 301 is configured to randomly select a plane as a first plane.

When the apparatus provided by the present invention is used to acquire a radial distortion parameter of a digital image capture device, the selecting unit 301 may randomly select a plane as the first plane. The first plane may include m straight lines, where the m straight lines are parallel to each other, and m≥2.

The photographing unit 302 is configured to make an optical axis of a digital image capture device perpendicular to the first plane that is selected by the selecting unit 301, and photograph the first plane to obtain a distorted image of the first plane, where the distorted image includes images of the m straight lines, the m straight lines are located on the first plane, the m straight lines are parallel to each other, and m≥2.

After the first plane is determined, the photographing unit 302 first adjusts a position and a stance of the digital image capture device so that the optical axis of the digital image capture device is perpendicular to the first plane. After adjustment, when the optical axis of the digital image capture device is perpendicular to the first plane, the digital image capture device is used to photograph the first plane to obtain the distorted image, where the distorted image needs to include images of the m parallel straight lines.

The acquiring unit 303 is configured to acquire n arcs from the distorted image that is obtained by photographing by the photographing unit 302, where each arc represents an image of a straight line in the m straight lines, and 2≤n≤m.

To acquire an arc Arc corresponding to an image of a straight line 1 from the distorted image, a direct fitting manner may be used, or a matching manner may be used. Subunits that are included in the acquiring unit 303 are different according to different acquiring manners.

Figure 4:
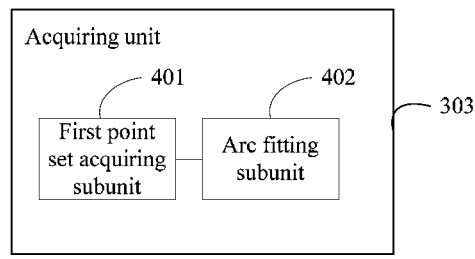
FIG. 4 is a block diagram of an embodiment of an acquiring unit of the radial distortion parameter acquiring apparatus according to the present invention.

Optionally, the acquiring unit 303 may include a first point set acquiring subunit 401 and an arc fitting subunit 402. FIG. 4 is a block diagram of an embodiment of the acquiring unit of the radial distortion parameter acquiring apparatus according to the present invention. The first point set acquiring subunit 401 is configured to acquire n point sets from the distorted image, where each point set includes three or more than three points in an image of a candidate straight line, and the candidate straight line is one of the m straight lines. The arc fitting subunit 402 is configured to obtain an arc by fitting by using each of the point sets that are acquired by the first point set acquiring subunit 401.

Figure 5:
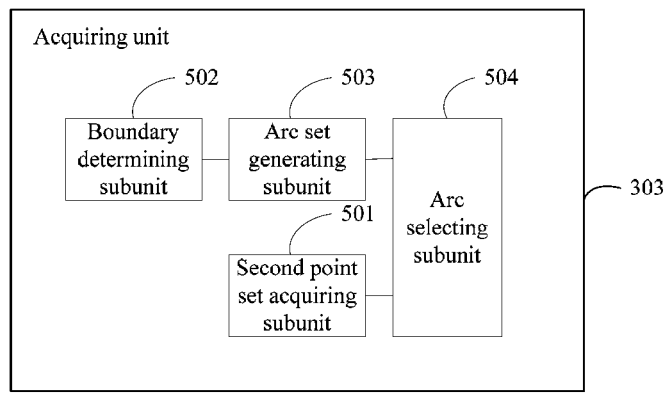
FIG. 5 is a block diagram of another embodiment of an acquiring unit of the radial distortion parameter acquiring apparatus according to the present invention.

Optionally, the acquiring unit 303 may include a second point set acquiring subunit 501, a boundary determining subunit 502, an arc set generating subunit 503, and an arc selecting subunit 504. FIG. 5 is a block diagram of another embodiment of the acquiring unit of the radial distortion parameter acquiring apparatus according to the present invention. The second point set acquiring subunit 501 is configured to acquire n point sets from the distorted image, where each point set includes three or more than three points in an image of a candidate straight line, and the candidate straight line is one of the m straight lines. The boundary determining subunit 502 is configured to determine an outline boundary of the distorted image. The boundary determining subunit 502 may include an edge point extracting subunit and an edge point linking subunit. The edge point extracting subunit is configured to extract edge points of the distorted image by using the Canny operator; and the edge point linking subunit is configured to link the edge points that are extracted by the edge point extracting subunit, to obtain the outline boundary of the distorted image. The arc set generating subunit 503 is configured to acquire an arc set from a distorted image within the outline boundary that is determined by the boundary determining subunit 502, where the arc set includes arcs corresponding to images of all straight lines in the distorted image within the outline boundary. When arc fitting is performed, the RANSAC algorithm may be used. The RANSAC algorithm has good robustness, which makes an arc that is obtained by fitting more accurate. The arc selecting subunit 504 is configured to separately acquire an arc from the arc set that is generated by the arc set generating subunit 503, where a distance from the arc to a point set that is acquired by the second point set acquiring subunit 501 is the shortest.

The calculating unit 304 is configured to obtain, by calculation, a radial distortion parameter of the digital image capture device according to the arcs that are acquired by the acquiring unit 303.

Figure 6:
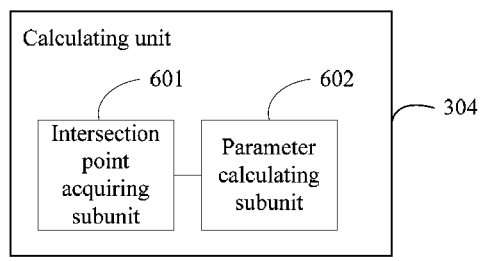
FIG. 6 is a block diagram of an embodiment of a calculating unit of the radial distortion parameter acquiring apparatus according to the present invention.

The calculating unit 304 may first obtain an intersection point of the n arcs, and then obtain, by calculation, a distortion center and a distortion coefficient according to the intersection point of the n arcs. FIG. 6 is a block diagram of an embodiment of the calculating unit of the radial distortion parameter acquiring apparatus according to the present invention. The calculating unit 304 may include an intersection point acquiring subunit 601, and a parameter calculating subunit 602. The intersection point acquiring subunit 601 is configured to acquire coordinates $(x_1, y_1)$ of a first intersection point of the n arcs and coordinates $(x_2, y_2)$ of a second intersection point of the n arcs according to curvilinear equations of the n arcs. The parameter calculating subunit 602 is configured to calculate coordinates $(x_{d0}, y_{d0})$ of a distortion center and a distortion coefficient $\lambda$ according to the coordinates of the intersection points, where the coordinates of the intersection points are acquired by the intersection point acquiring subunit 601, $x_{d0}=(x_1+x_2)/2$, $y_{d0}=(y_1+y_2)/2$, $\lambda=-4/d^2$, and $d=\sqrt{(x_1-x_2)^2+(y_1-y_2)^2}$.

It may be seen from the foregoing embodiment that, a radial distortion parameter of a digital image capture device may be acquired by using the digital image capture device to photograph only one distorted image, and the radial distortion parameter acquiring apparatus is convenient in operation. The acquiring of the distorted image does not depend on a calibration board, and therefore, a reference object may be found in a natural environment and the radial distortion parameter acquiring apparatus has wide applicability. Therefore, the acquiring apparatus provided by this embodiment has advantages such as convenient operation, wide applicability, and high practicability.

A person skilled in the art may clearly understand that, the technique in the embodiments of the present invention may be implemented through software and a necessary general hardware platform. Based on such an understanding, the technical solutions in the embodiments of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, mutual reference may be made to a same or similar part of the embodiments, and each embodiment focuses on illustrating a difference from other embodiments. In particular, for the apparatus embodiment, because it is basically similar to the method embodiment, the apparatus embodiment is described simply, and for a relevant part, reference may be made to the part of the description of the method embodiment.

The foregoing embodiments of the present invention are not intended to limit the protection scope of the present invention. Any modifications, equivalent substitutions and improvements made within the spirit and principle of the present invention shall fall within the protection scope of the present invention.

What is claimed is:

1. A radial distortion parameter acquiring and correction method, comprising:
    selecting, by a computer device comprised in a radio distortion parameter acquiring apparatus, a plane as a first plane;
    making an optical axis of a digital image capture device perpendicular to the first plane, and photographing the first plane to obtain a distorted image of the first plane, wherein the distorted image comprises images of m straight lines, the m straight lines are located on the first plane and are parallel to each other, and m ≥2;
    acquiring n point sets from the distorted image, determining an outline boundary of the distorted image;
    acquiring an arc set from the distorted image within the outline boundary;
    acquiring n arcs by separately acquiring an arc from the arc set, wherein a distance from the arc to a point set among the n point sets is the shortest, each arc represents an image of a straight line in the m straight lines, and 2≤n≤m;
    obtaining a radial distortion parameter of the digital image capture device according to the n arcs; and
    correcting the distorted image using the radial distortion parameter.

2. The method according to claim 1, wherein acquiring the n arcs from the distorted image comprises:
    acquiring the n point sets from the distorted image, wherein each point set includes at least three points in an image of a candidate straight line, and the candidate straight line is one of the m straight lines; and
    obtaining an arc by fitting, using each of the n point sets.

3. The method according to claim 1,
    wherein each point set includes at least three points in an image of a candidate straight line, and the candidate straight line is one of the m straight lines;
    wherein the arc set comprises arcs corresponding to images of all straight lines in the distorted image within the outline boundary.

4. The method according to claim 3, wherein determining the outline boundary of the distorted image comprises:
    extracting edge points of the distorted image by using a Canny operator; and
    linking the edge points to obtain the outline boundary of the distorted image.

5. The method according to claim 3, wherein the acquiring the arc set from the distorted image within the outline boundary comprises:

acquiring the arc set from the distorted image within the outline boundary using Random Sample Consensus (RANSAC) algorithm, wherein the arc set comprises the arcs corresponding to the images of all the straight lines in the distorted image within the outline boundary.

6. The method according to claim 1, wherein obtaining, the radial distortion parameter of the digital image capture device according to the arcs comprises:

acquiring coordinates $(x_1, y_1)$ of a first intersection point of the n arcs and coordinates $(x_2, y_2)$ of a second intersection point of the n arcs; and determining coordinates $(x_{d0}, y_{d0})$ of a distortion center and a distortion coefficient $\lambda$ according to the coordinates of the intersection points, wherein $x_{d0}=(x_1+x_2)/2$, $y_{d0}=(y_1+Y_2)/2$, $\lambda=-4/d^2$, and $d=\sqrt{(x_1-x_2)^2+(y_1-y_2)^2}$.

7. A radial distortion parameter acquiring and correction apparatus, comprising:

a processor, and a memory coupled to the processor, wherein the memory includes processor-executable instructions which when executed causes the processor to implement operations comprising:

selecting a plane as a first plane;

making an optical axis of a digital image capture device perpendicular to the selected first plane, and photographing the first plane to obtain a distorted image of the first plane, wherein the distorted image comprises images of m straight lines, the m straight lines are located on the first plane, the m straight lines are parallel to each other, and m≥2;

acquiring n point sets from the distorted image, determining an outline boundary of the distorted image;

acquiring an arc set from the distorted image within the determined outline boundary;

acquiring n arcs from the distorted image by separately acquiring an arc from the arc set, wherein a distance from the arc to a point set among the acquired n point sets is the shortest, each arc represents an image of a straight line in the m straight lines, and 2≤n≤m;

obtaining a radial distortion parameter of the digital image capture device according to the acquired n arcs; and correcting the distorted image using the radial distortion parameter.

8. The apparatus according to claim 7, wherein when acquiring the n arcs from the obtained distorted image, the operations further comprises:

acquiring the n point sets from the distorted image, wherein each point set comprises at least three points in an image of a candidate straight line, and the candidate straight line is one of the m straight lines; and obtaining an arc by fitting, using each of the required n point sets.

9. The apparatus according to claim 7, wherein each point set comprises at least three points in an image of a candidate straight line, and the candidate straight line is one of the m straight lines;

wherein the arc set comprises arcs corresponding to images of all straight lines in the distorted image within the outline boundary.

10. The apparatus according to claim 9, wherein the operation of determining the outline boundary of the distorted image further comprises:

extracting edge points of the distorted image using a Canny operator; and linking the extracted edge points, to obtain the outline boundary of the distorted image.

11. The apparatus according to claim 9, wherein the operation of acquiring the arc set from the distorted image within the determined outline boundary further comprises:

acquiring the arc set from the distorted image within the outline boundary by using Random Sample Consensus (RANSAC) algorithm, wherein the arc set comprises the arcs associated with the images of all the straight lines in the distorted image within the outline boundary.

12. The apparatus according to claim 7, wherein the operation of obtaining the radial distortion further comprises:

acquiring coordinates $(x_1, y_1)$ of a first intersection point of the n arcs and coordinates $(x_2, y_2)$ of a second intersection point of the n arcs; and determining coordinates $(x_{d0}, y_{d0})$ of a distortion center and a distortion coefficient $\lambda$ according to the coordinates of the intersection points, wherein the coordinates of the intersection points are acquired by the intersection point acquiring subunit, $x_{d0}=(x_1+x_2)/2$, $y_{d0}=(y_1+y_2)/2$, $\lambda=-4/d^2$, and $d=\sqrt{(x_1-x_2)^2+(y_1-y_2)^2}$.

* * * * *